United States Patent

Shirakawa et al.

(10) Patent No.: US 9,847,540 B2
(45) Date of Patent: Dec. 19, 2017

(54) FUEL CELL UNIT

(71) Applicant: TOYOTA JIDOSHA KABUSHIKI KAISHA, Toyota-shi, Aichi-ken (JP)

(72) Inventors: Tsutomu Shirakawa, Toyota (JP); Hiroyuki Imanishi, Toyota (JP); Noboru Usami, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 49 days.

(21) Appl. No.: 14/786,224

(22) PCT Filed: Apr. 14, 2014

(86) PCT No.: PCT/JP2014/060654
§ 371 (c)(1),
(2) Date: Oct. 22, 2015

(87) PCT Pub. No.: WO2014/175108
PCT Pub. Date: Oct. 30, 2014

(65) Prior Publication Data
US 2016/0133968 A1    May 12, 2016

(30) Foreign Application Priority Data

Apr. 23, 2013   (JP) .................................. 2013-090309

(51) Int. Cl.
*H01M 8/04537* (2016.01)
*H01M 8/2465* (2016.01)
(Continued)

(52) U.S. Cl.
CPC ......... *H01M 8/04552* (2013.01); *H01M 8/04* (2013.01); *H01M 8/04671* (2013.01);
(Continued)

(58) Field of Classification Search
None
See application file for complete search history.

(56) References Cited

U.S. PATENT DOCUMENTS

| 2010/0065359 A1 | 3/2010 | Jufuku et al. |
| 2015/0017563 A1 | 1/2015 | Shirakawa et al. |

FOREIGN PATENT DOCUMENTS

| JP | 2002-160673 | 6/2002 |
| JP | 2004-362860 | 12/2004 |

(Continued)

OTHER PUBLICATIONS

Yoshida (JP, 2013-004211) (a raw machine translation) (Abstract, Detailed Description and Drawings) (Jan. 7, 2013).*

(Continued)

*Primary Examiner* — Miriam Stagg
*Assistant Examiner* — Carmen Lyles-Irving
(74) *Attorney, Agent, or Firm* — Finnegan, Henderson, Farabow, Garrett & Dunner, LLP (57) ABSTRACT

A fuel cell unit has a structure that enables the maximum use of a cell monitor in the height direction (vertical direction). In order to achieve this, the fuel cell unit comprises a fuel cell stack (3) including a cell stack body in which unit cells are stacked; and a cell monitor (6) for monitoring a voltage of the unit cells, wherein the cell monitor (6) is arranged so as to be inclined relative to a vertical direction. The cell monitor is inclined by providing a part of the cell monitor in the vicinity of a heat-generating part in a fuel cell on an opposite side of the heat-generating part relative to a central part in the vertical direction of the cell monitor and providing a part of the cell monitor in an area other than the heat-generating part in the fuel cell on a heat-generating part side relative to the central part in the vertical direction of the cell monitor.

6 Claims, 6 Drawing Sheets

(51) Int. Cl.
*H01M 8/04* (2016.01)
*H01M 8/24* (2016.01)
*H01M 8/04664* (2016.01)

(52) U.S. Cl.
CPC ........... *H01M 8/24* (2013.01); *H01M 8/2465* (2013.01); *H01M 2250/20* (2013.01); *Y02T 90/32* (2013.01)

(56) References Cited

FOREIGN PATENT DOCUMENTS

| | | |
|---|---|---|
| JP | 2006-99983 | 4/2006 |
| JP | 2007-322146 | 12/2007 |
| JP | 2008-279955 | 11/2008 |
| JP | 2009-163909 | 7/2009 |
| JP | 2010-135243 | 6/2010 |
| JP | 2010-257804 | 11/2010 |
| JP | 2012-121393 | 6/2012 |
| JP | 2013-4211 | 1/2013 |
| JP | 2013-180643 | 9/2013 |

OTHER PUBLICATIONS

Yamada et al. (JP, 2007-322146) (a raw machine translation) (Abstract, Detailed Description & Drawings) (Dec. 13, 2007).*
Saito et al. (JP, 2004-362860) (a raw machine translation) (Abstract, Detailed Description & Drawings) (Dec. 24, 2004)*

* cited by examiner

FUEL CELL UNIT

CROSS-REFERENCE TO RELATED APPLICATIONS

This application is a national phase application of International Application No. PCT/JP2014/060654, filed Apr. 14, 2014, and claims the priority of Japanese Application No. 2013-090309, filed Apr. 23, 2013, the content of both of which is incorporated herein by reference.

TECHNICAL FIELD

The present invention relates to a fuel cell unit. More specifically, the present invention relates to an improvement in an installation structure for a cell monitor in a fuel cell unit.

BACKGROUND ART

In order to measure the voltage (cell voltages) of the unit cells in a fuel cell, a cell monitor (a cell voltage measuring apparatus) is used to monitor a power generation status such as variation in the cell voltage during power generation. As a conventional structure for installation of a cell monitor, a structure in which the cell monitor is arranged on a lateral surface (for example, on an end plate-side) of a fuel cell stack (a cell stack body) has been proposed (see, for example, Patent Document 1).
Patent Document 1: JP2010-257804 A

DISCLOSURE OF THE INVENTION

Problem to be Solved by the Invention

However, in the conventional structure as described above, since the cell monitor is installed so as to extend along a height direction (the vertical direction), it has been difficult to make the maximum use of the cell monitor in the height direction. Specifically, in a situation where a fuel cell stack and a cell monitor are installed under a vehicle floor, there is a strict height limitation of the fuel cell stack and the internal space of a stack case, which makes the maximum use of the underfloor structure, cannot be utilized efficiently enough.

Under such circumstances, the object of the present invention is to provide a fuel cell unit capable of making the maximum use of a cell monitor in the height direction (vertical direction).

Means for Solving the Problem

The inventors of the present invention have conducted intensive studies in order to achieve the object above and finally obtained a finding which leads to the achievement of the object. The present invention is based on such finding and provides a fuel cell unit that comprises a cell stack body in which unit cells are stacked; and a cell monitor for monitoring the voltage of the unit cells, wherein the cell monitor is arranged so as to be inclined relative to the vertical direction.

In this fuel cell unit, since the cell monitor is arranged so as to be inclined with respect to the vertical direction, it is possible to use a cell monitor that is larger in the height direction and smaller in the width direction as compared to conventional cell monitors.

In the fuel cell unit, the cell monitor may be inclined by providing a part of the cell monitor in the vicinity of a heat-generating part in a fuel cell on the opposite side of the heat-generating part relative to a central part in the vertical direction of the cell monitor and providing a part of the cell monitor in an area other than the heat-generating part in the fuel cell on a heat-generating part side relative to the central part in the vertical direction of the cell monitor.

In such case, the cell monitor is inclined so as to be apart from the heat-generating part within the cell stack body. Accordingly, it is possible to suppress deterioration of the cell monitor due to heat.

The fuel cell unit may further comprise a bracket for fixing the cell monitor, the bracket being arranged on a lateral surface in a horizontal direction of the cell monitor In some conventional structure, a bracket is arranged on a cell monitor surface on the opposite side of the fuel cell stack. On the other hand, by arranging the bracket on the lateral surface in the horizontal direction of the cell monitor as in the present invention, a space between the cell monitor surface on the opposite side of the fuel cell stack and an internal wall surface of the stack case can be enlarged. Accordingly, it is possible to improve workability in wiring operation of a voltage detection wire due to the enlarged space without needing to increase the size of the stack case.

The fuel cell unit may further comprise a clamp for restricting a direction in which a cable extends from the cell monitor, wherein the bracket is further provided with a clamp seat that allows the clamp to be seated thereon, and a seating surface of the clamp seat is provided at an angle that allows a gap between the clamp and the clamp seat to be visible.

With such configuration, by arranging the clamp so as to be inclined from a visual observation direction, it is possible to easily check the seating of the clamp.

In the fuel cell unit, the clamp may be further provided with a through-hole that allows the cable to pass through the clamp, the through-hole being arranged in a direction of projection of the cable wired from the cell monitor to outside.

Effect of the Invention

According to the present invention, it is possible to make the maximum use of the cell monitor in the height direction (vertical direction).

BEST MODE FOR CARRYING OUT THE INVENTION

The configuration of the present invention will be described in detail based on an example embodiment shown in the attached drawings (see FIGS. 1-8).

<Outline of Unit Cells, Cell Stack Body, Etc.>

A fuel cell unit 1 of the present embodiment has a cell stack body in which a plurality of unit cells (hereinafter simply referred to as "cells" in some context) is stacked and the cell stack body has a structure in which current collectors provided with output terminals and insulating plates are arranged sequentially on the outer side of the cells 2, 2 that are located at the respective ends of the cell stack body. The fuel cell stack 3 including such cell stack body, etc. is fastened with a load applied thereto in a stacking direction in a state where the fuel cell stack is sandwiched by a pair of end plates (not shown) and restriction members constituted by tension plates (not shown) are arranged so as to connect these endplates.

The unit cell 2 includes: a membrane-electrode assembly (not shown) in which electrodes are arranged on both surfaces of an electrolyte membrane; and a pair of separators (not shown) sandwiching the membrane-electrode assembly. The unit cells 2 are stacked in series so as to constitute the cell stack body. The stack body of the fuel cell stack 3 is provided with a gas exhaust through-bore 4 (see FIG. 1).

Figure 1:
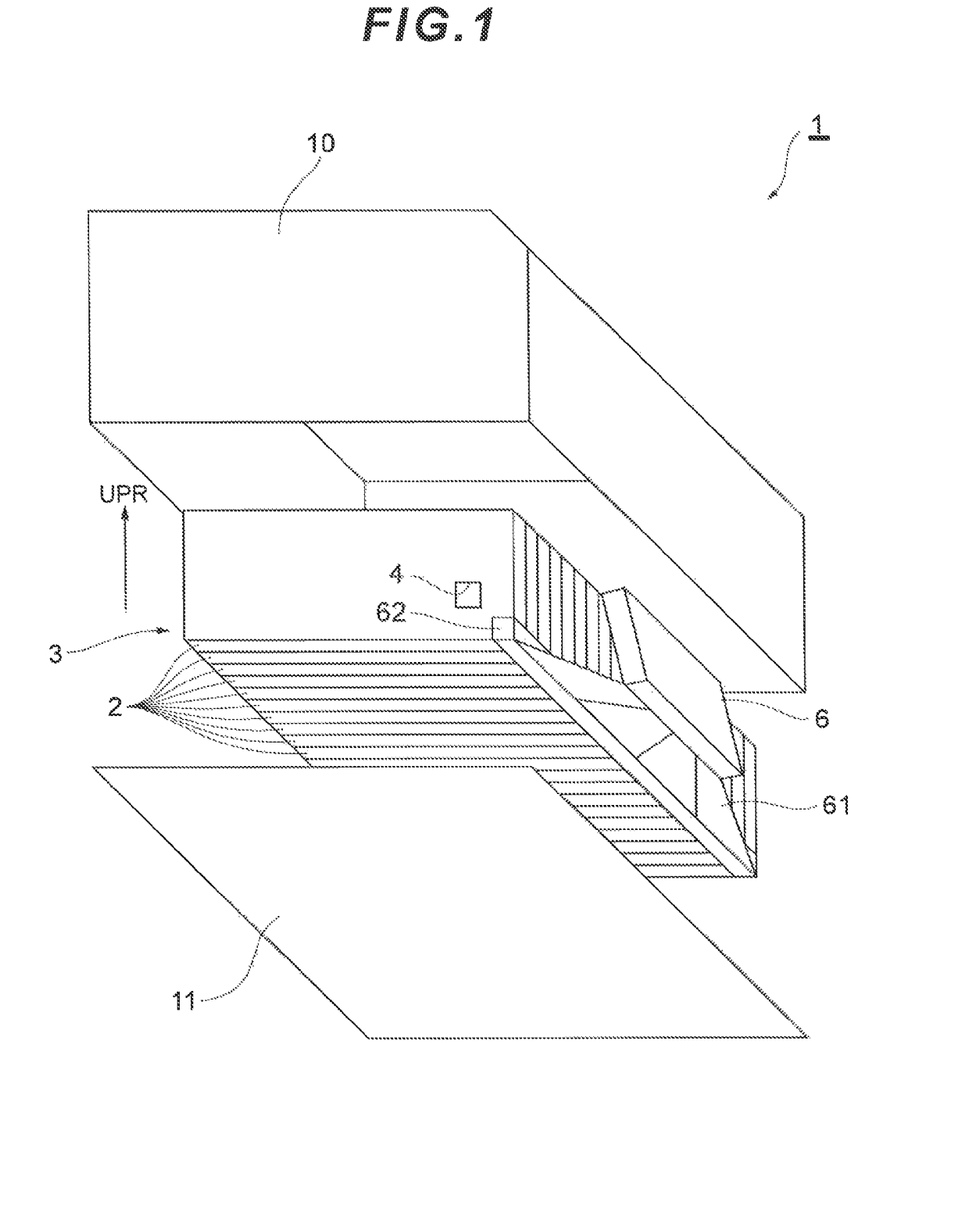
FIG. 1 is an exploded perspective view showing an example configuration of a fuel cell unit according to an embodiment of the present invention, as viewed from diagonally below.

The fuel cell stack 3 is accommodated in a stack case 10 (see FIG. 1). Although the way of accommodating the fuel cell stack 3 is not particularly limited, the fuel cell stack 3 of the present embodiment is accommodated into the stack case 10 from its bottom surface side in a transversely-situated posture such that the cell stacking direction is oriented perpendicularly to the vertical direction (in FIG. 1, the upper side in the vertical direction is indicated by an arrow and the reference symbol UPR). A cover 11 is provided to the bottom surface of the stack case 10 that accommodates the fuel cell stack 3 (see FIG. 1).

Figure 2:
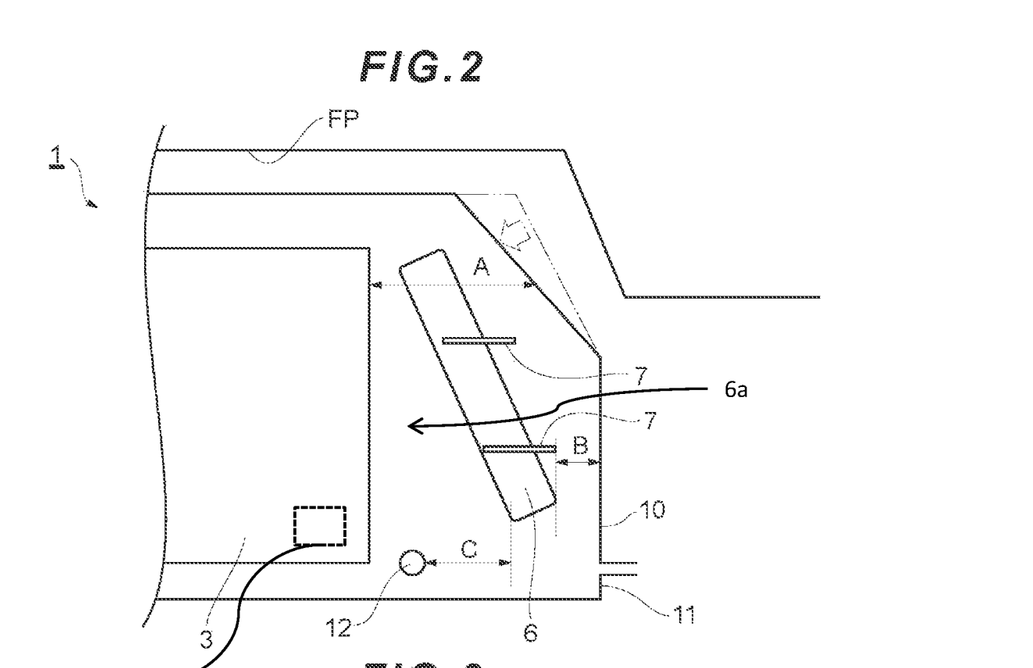
FIG. 2 is a diagram showing an example configuration of a part around a cell monitor of the fuel cell unit which is arranged under a floor panel of a fuel cell vehicle.

When the fuel cell unit 1 is used as an in-vehicle power generation system of a fuel cell hybrid vehicle (FCHV), the stack case 10 is installed, for example, under a vehicle floor, such as under a floor panel FP of the vehicle (see FIG. 2). This is only an example of application and the fuel cell unit 1 may alternatively be used as a power generation system installed in a variety of movable bodies (such as ships and airplanes) and in self-propelled articles such as robots, as well as a stationary power generation system.

In the present embodiment, a cell monitor (cell voltage measuring apparatus) 6 for monitoring the voltage of each unit cell 2 is used as a means for diagnosing the fuel cell. The cell monitor 6 measures the voltage of each unit cell 2 (cell voltage) using a voltage detector to which a voltage detection wire 61 is connected and provides a material for diagnosing the power generation status. The voltage detector 5 is a terminal (a cell monitor terminal) for detecting the voltage (cell voltage) of each unit cell 2 (see FIG. 1 and FIG. 2).

The following description of the present embodiment will first describe the outline of the configurations of the unit cell 2, the fuel cell stack 3, etc. that constitute the fuel cell unit 1, then describe problems that some fuel cell units having the conventional structure has had as a comparative example, and then describe the installation structure of the cell monitor 6 in the fuel cell unit 1, by comparing it with the conventional structure.

<Problems that Some Fuel Cell Units Having Conventional Structures has Faced (Comparative Example 1)>

Figure 9:
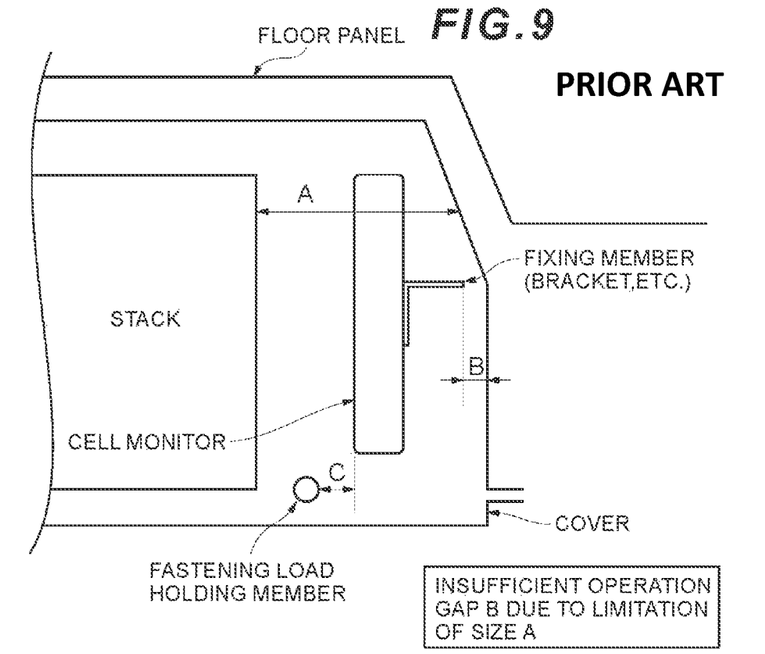
FIG. 9 is a diagram showing, as a comparative example, an example configuration of a part around a cell monitor of a conventional fuel cell unit that is arranged below a floor panel of a fuel cell vehicle.
Figure 10:
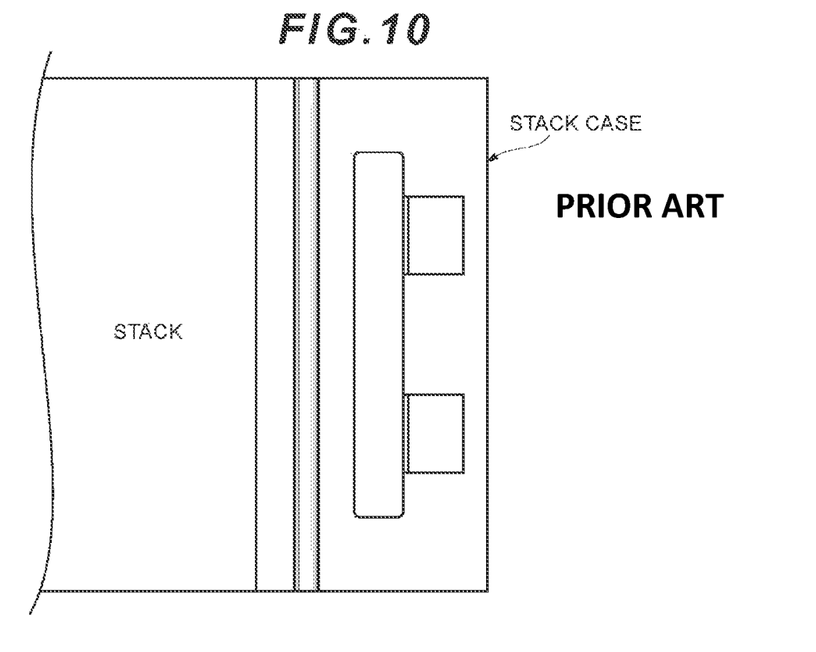
FIG. 10 is a diagram showing, as a comparative example, a configuration of the fuel cell unit shown in FIG. 9 (with its stack case omitted) as viewed from the bottom surface side thereof.

Examples of such problems include the following (see FIGS. 9 and 10).

(I) The height of a fuel cell stack tends to be large. Specifically, when unit cells are installed under a vehicle floor of a fuel cell vehicle, there is a strict size limitation particularly in the height direction (vertical direction).

(II) Since a drip-proof protector, a water-proof connector, etc. are needed, the number of components and thus the size are increased. Specifically, dew condensation water, etc. may flow on and along the voltage detection wire and enter the cell monitor or the cells. This phenomenon significantly occurs in the structure in which the unit cells are installed under the vehicle floor.

(III) The positions of a cell-side connector and a cell monitor-side connector of the voltage detection wire may not be set previously and, in some cases, the workability of attaching the voltage detection wire may be poor and the detection wire may need to be folded.

(IV) The cell monitor may be provided near a heat-generating part (e.g., near the cell-side connector) of the fuel cell stack. In such case, the cell monitor may be deteriorated due to heat.

(V) When a clamp for restricting the direction of a cable extending from the cell monitor is attached, the operator attaches the clamp in the vertical direction as viewed from the visual observation direction and it may be difficult to see the clamp and a connecting surface for attachment.

(VI) A cable wired from the cell monitor may come into contact with and damage a corner or the like of the cell monitor.

In connection with the problem (I) above, in some conventional and typical fuel cell units, a space required for the attaching operation of the cell monitor cannot be secured due to limitations of space. In such case, problems such as poor workability in the attaching operation of the cell monitor, increased cost due to an increase in the operation time, and interference with peripheral components may arise. Furthermore, in addition to the fact that there is a limitation of height, since an area of a certain size is required for mounting devices, the width of the cell monitor tends to be large. Thus, it is difficult to arrange a fixing member (a bracket) for the cell monitor on lateral portions in the width direction of the cell monitor. In such case, the bracket has to be arranged on a cell monitor surface on the opposite side of the fuel cell stack in order to avoid interference between the bracket and the stack case (see FIGS. 9 and 10)

<Embodiments of Present Invention (Installation Structure of Cell Monitor 6 in Fuel Cell Unit)>

The cell monitor 6 of the present embodiment is arranged on a lateral surface (a cell-stacking surface, i.e., a lateral surface along the cell stacking direction) of the fuel cell stack 3 and accommodated in the stack case 10 together with the fuel cell stack 3. In addition, the cell monitor 6 is arranged so as to be inclined with respect to the vertical direction (downward in the direction of gravitational force) (see FIG. 2). By inclining the cell monitor 6 in such state within the stack case 10, it becomes possible to reduce the size of the stack case 10 by chamfering the stack case 10 at a portion near the floor panel FP or by increasing a chambered portion that originally exists (see the alternate long and two short dashes line in FIG. 2). (In particular, it is possible to reduce the size (size A) of an area extending from the lateral surface of the fuel cell stack 3 to (a part of) an inclined portion resulting from the chamfering of the stack case 10 (the area shown by reference symbol A in FIG. 2)). By reducing the size of the stack case 10 in this way, it becomes possible to increase the space within the compartment of the fuel cell hybrid vehicle and therefore possible to solve the problem (I) above.

With respect to such cell monitor 6, the cell-side connector 62 of the voltage detection wire 61 is arranged on the surface on which the cell monitor 6 is arranged, so as to be aligned along a lower side edge (a lower edge) in the vertical direction of the cell monitor 6 (see FIG. 1). By arranging the cell-side connector 62 as described above, the voltage detection wire 61 can be wired without being folded and the problem (III) above can thus be solved. In addition, by arranging the cell-side connector 62 so as to be aligned along the lower side edge in the vertical direction of the cell monitor 6, the problems (II) and (III) above can be solved.

It should be noted that the cell-side connector 62 is preferably arranged near the gas exhaust through-bore 4 (see FIG. 1). In such case, by monitoring an area around a portion that is susceptible to voltage decrease, the voltage status of the cells 2 can be detected promptly.

When the cell monitor 6 is arranged so as to be inclined with relative to the vertical direction as described above, the space between the fuel cell stack 3, being a heat source, and the cell monitor 6 can be increased. By providing such inclination, although an upper portion in the vertical direction of the cell monitor 6 is placed close to the fuel cell stack 3, the heat generating effect (the amount of heat generation) of the fuel cell stack 3 is, in general, higher in a lower portion (a portion near the connector) than in an upper portion. Thus, it is possible to place the cell monitor 6, which is located near the connector having a high heat generating effect, apart from the fuel cell stack 3. With such configuration, the problem (IV) above can be solved, where the effect of the heat from the fuel cell stack 3 to be exerted on the cell monitor 6 can be reduced, the lifetime of the resulting product can be increased, and cost reduction can be achieved due to a relaxation of the heat resistance specification.

In the fuel cell unit 1 in which the cell monitor 6 is arranged as described above, it is possible to employ a cell monitor 6 that is larger in the height direction (longer in the longitudinal direction) and smaller in the width direction as compared to conventional ones. Specifically, although the cell monitor 6 has conventionally tended to be large in the width direction since an area of a certain size is required for mounting a predetermined device in the presence of the height limitation of the cell monitor 6 as described above, the present embodiment can employ the cell monitor 6 that is larger in the height direction (longer in the longitudinal direction) as compared to the conventional ones, the size of the cell monitor 6 in the width direction can be reduced (the cell monitor 6 can be made narrower) accordingly.

Figure 3:
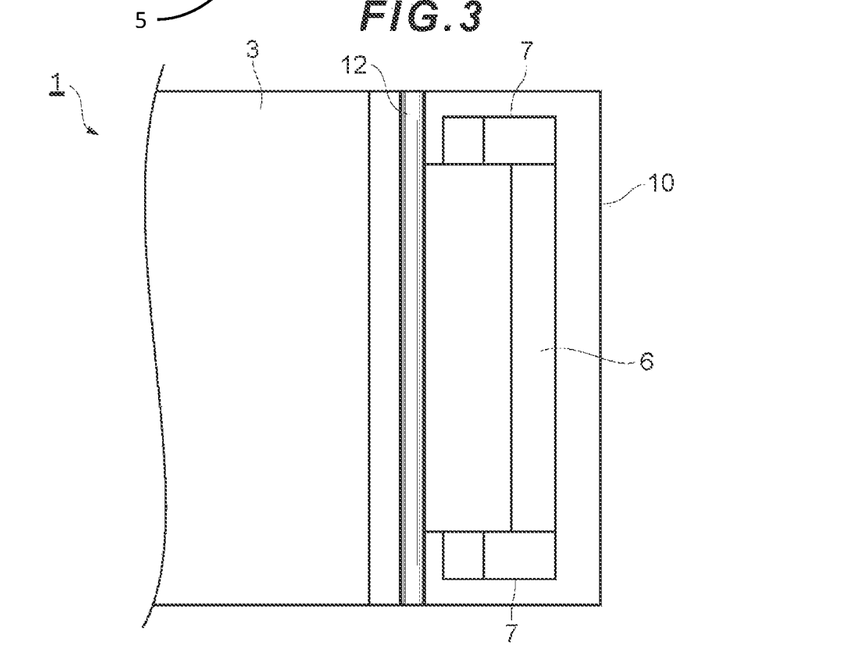
FIG. 3 is a diagram showing the fuel cell unit shown in FIG. 2 (with its stack case omitted) as viewed from the bottom surface side thereof.

In the present embodiment, the brackets 7 for fixing the cell monitor 6 are arranged on lateral surfaces in the horizontal direction of such narrowed cell monitor 6 (on both sides in the width direction of the cell monitor 6) so as not to interfere with the stack case 10 (see FIGS. 2 and 3). When the brackets 7 are arranged in this way, any bracket does not have to be arranged on a surface, on the opposite side of the fuel cell stack 3, of the cell monitor 6, as a matter of course. With such configuration, it becomes possible to solve the problems (III) and (V) above by increasing a size B (the size between the bracket 7 and the inner wall of the stack case 10) without needing to increase the size of the stack case 10. Alternatively, it is also possible to secure a certain area on a rear side of the cell monitor 6 (on the opposite side of the fuel cell stack 3), so that the cell monitor 6 can be arranged farther apart from the heat-generating part.

A fastening load holding member is denoted by reference numeral 12 in FIG. 2. In addition, a space in the horizontal direction between the lowermost end of the cell monitor 6 and the fastening load holding member is denoted by reference symbol C.

The following description of the embodiment will first describe a communication cable (a harness) of a voltage detection unit for a fuel cell by indicating problems that some conventional structure has had as a comparative example, and then describe a communication cable of a voltage detection unit in the fuel cell unit 1 of the present embodiment by comparing it with the conventional structure. The voltage detection unit is a unit comprising (1) a unit body, (2) a connector and a wire assembly (e.g., about 10 wires) for measuring the cell voltage of the unit cells, (3) a cable 9 for communication between the voltage detection unit and, for example, an in-vehicle ECU, etc.

<Problems that Some Conventional Communication Cable has had (Comparative Example 2)>

The communication cable 9 needs to be wired (laid) in a very narrow area within the stack case 10. In addition, the position for wiring the communication cable 9 is a corner in the stack case 10 where the communication cable 9 may interfere with a casting surface of the case. Furthermore, the communication cable 9 is typically long. Since there are high-voltage components (such as the fuel cell) and a high-temperature component (a bus bar) around the communication cable, the wiring operation is difficult.

The configuration of such conventional communication cable and the resulting problems include the following:

A bracket and a clamp seat for restricting wiring were conventionally provided separately.

The clamp was inserted into the bracket as a separate component from thereabove. Since they were separate components, they were expensive and required a lot of operation steps. In addition, it was not possible to check whether the clamp could be inserted completely or not.

<Embodiment of the Present Invention (Regarding the Wiring of Communication Cable)>

Figure 4:
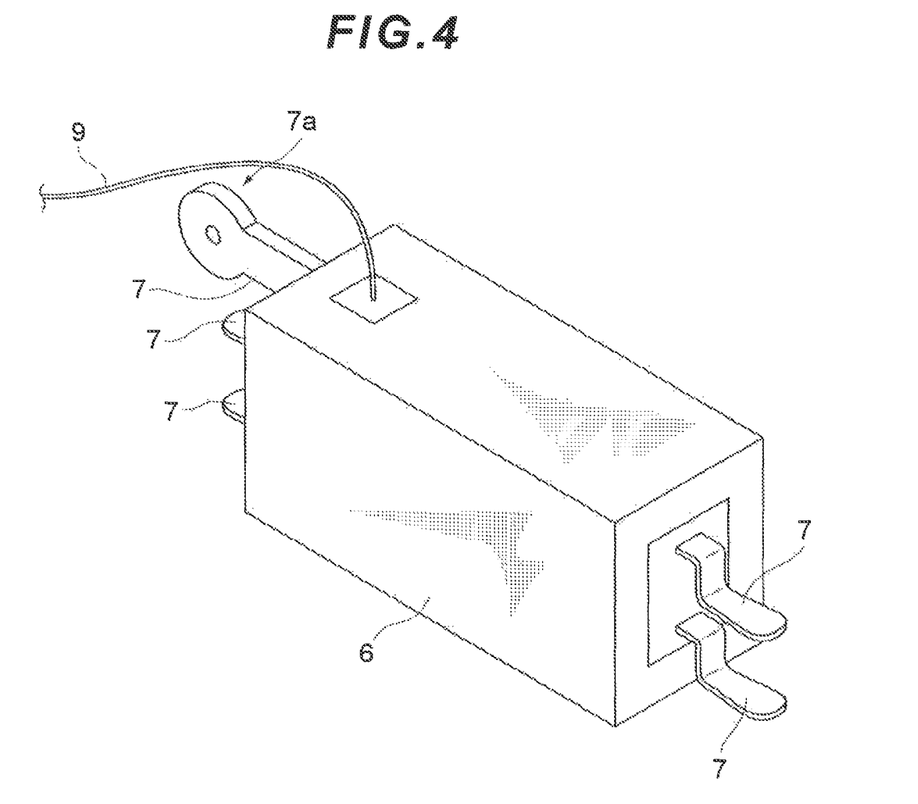
FIG. 4 is a perspective view showing an example configuration of a cell monitor provided with a bracket with a clamp seat.
Figure 5:
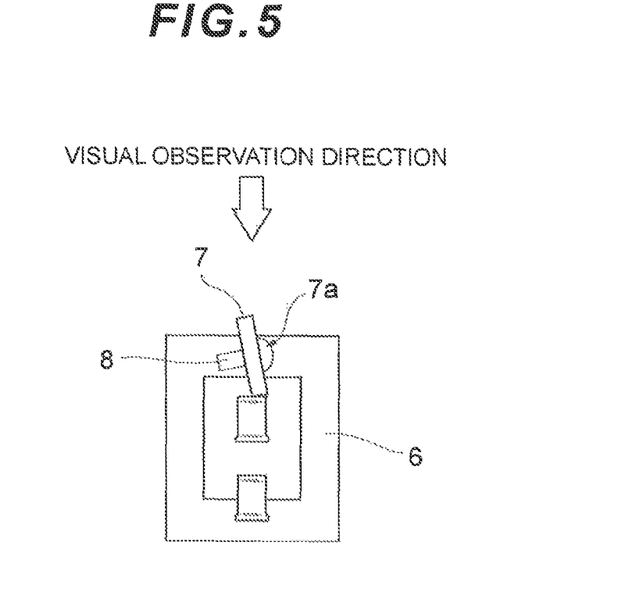
FIG. 5 is a plan view of the cell monitor as shown in FIG. 4.
Figure 6:
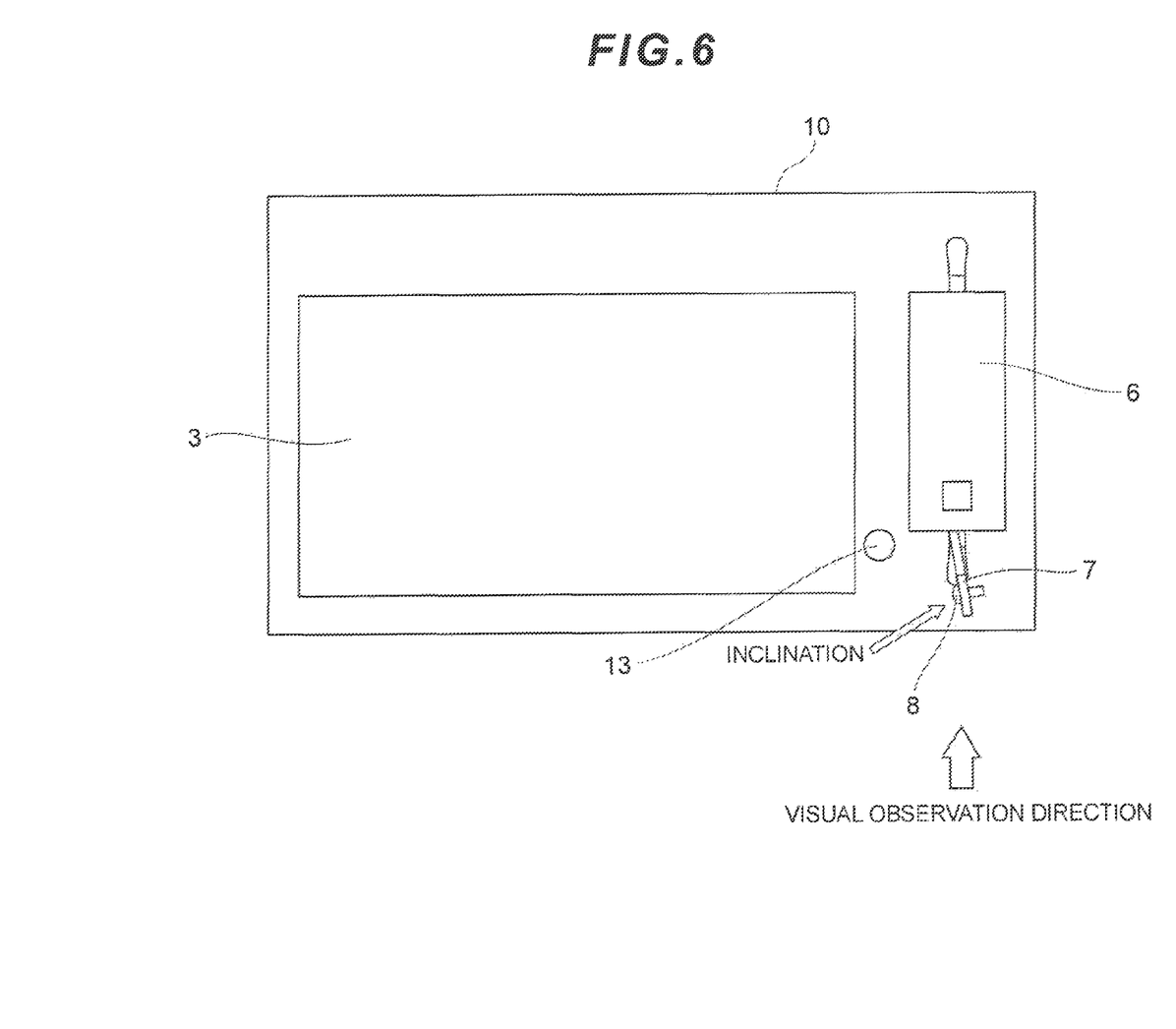
FIG. 6 is a plan view showing a fuel cell unit including the bracket with the clamp seat and showing a visual observation direction of an operator.
Figure 7:
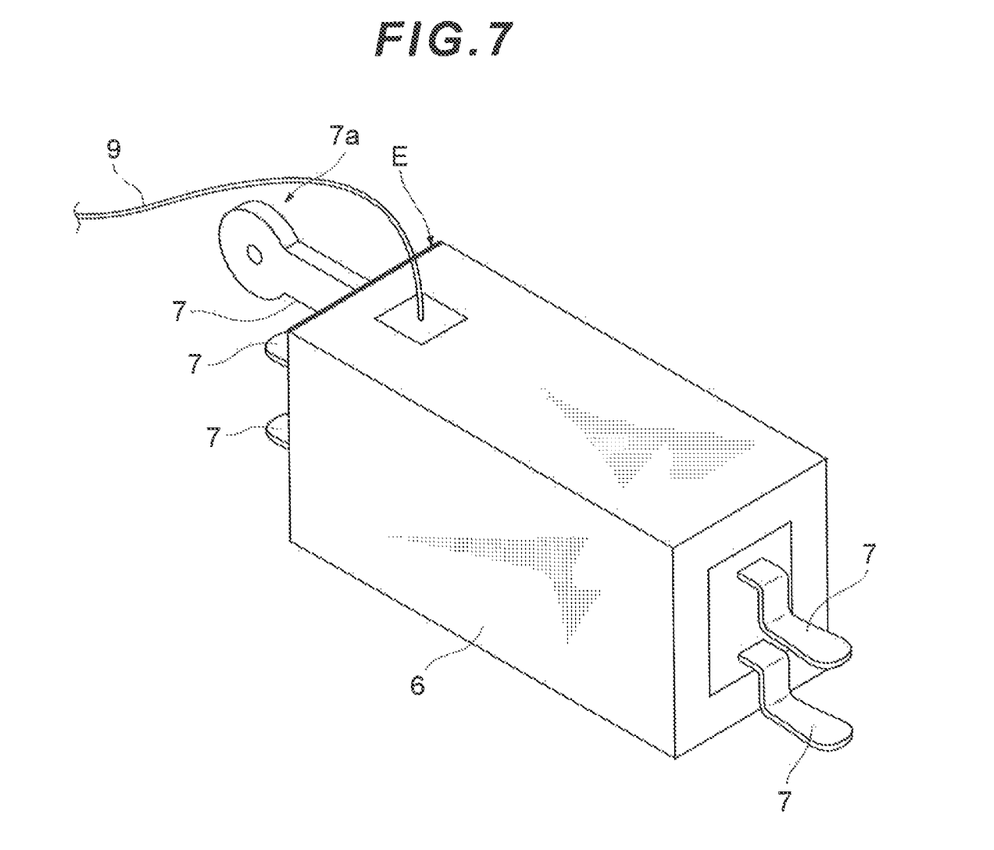
FIG. 7 is a perspective view showing an example of a cell monitor with a communication cable that is wired so as not to interfere with an edge of the cell monitor.

The fuel cell unit 1 in the present embodiment is further provided with a clamp 8 for restricting the direction of the communication cable 9 extending from the cell monitor 6 (see FIGS. 4-6). In the present embodiment, a clamp seat 7a for allowing this clamp 8 to be seated and fixed thereon is provided integrally to the bracket 7 for fixing the cell monitor 6 and the seating surface of such clamp seat 7a has an angle that allows a gap between the clamp 8 and the clamp seat 7a to be visible. In other words, by employing the clamp seat 7a having a shape with an inclined seating surface or by attaching the bracket 7 such that the seating surface is inclined, the seating surface is inclined appropriately. With such configuration, by arranging the clamp 8 with an inclination in the visual observation direction of an operator, the seating of the clamp 8 can be checked (whether the clamp 8 has been seated securely on the clamp seat 7a of the bracket 7 can be checked) easily by visual observation (see FIG. 6, etc.). In addition, as compared to the conventional structure that required cost for components and cost for attachment separately because of the bracket for clamp provided as a separate component, such excess expense can be advantageously eliminated. It should be noted that although there are various specific embodiments for arranging the gap between the clamp 8 and the clamp seat 7a so as to be visible, one example is an embodiment in which the clamp 8 is arranged so as to be inclined relative to the downward direction of the vertical line (see FIG. 6, etc.).

The brackets 7 are arranged at positions that are aligned in the longitudinal direction of the cell monitor 6 (see FIG. 4, etc.) The brackets 7 are attached to the respective ends of the cell monitor 6 by, for example, spot welding at two spots (see FIG. 4, etc.). Reference numeral 13 in FIG. 6 denotes a tension shaft and reference numeral 91 in FIG. 7 denotes a connector for the communication cable 9.

Figure 8:
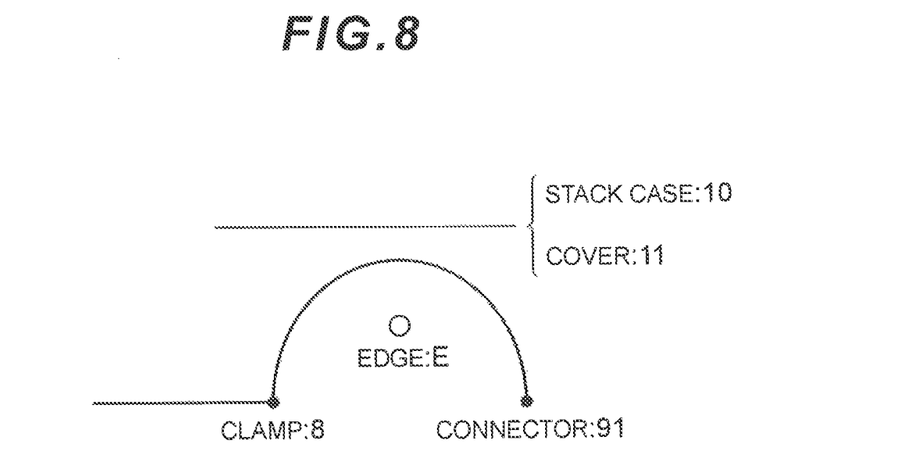
FIG. 8 is a diagram showing the outline of an example wiring of a communication cable that does not interfere with the edge of the cell monitor.

The seating position of the clamp 8 is preferably arranged such that the communication cable 9 does not interfere with an edge (denoted by reference symbol E in FIG. 7) of the cell monitor 6 (see FIG. 8). In such case, it is possible to prevent the communication cable 9 from coming into contact with and damaging the edge E. In this case, it is further possible to select an option of not providing processes, such as chamfering and rounding of the edge E, which would require a high cost, thereby reducing the cost for such processes. It should be noted that the clamp position should preferably be set such that the shortest communication cable 9 in the possible length variations would not interfere with the edge E of the cell monitor 6.

In the fuel cell unit 1 of the present embodiment, the clamp 8 is further provided with a through-hole (not shown) for allowing the communication cable 9 to pass through the clamp 8. This through-hole is preferably arranged in a direction of projection of the communication cable 9 wired from the cell monitor 6 to the outside. By wiring the communication cable using such through-hole, it is possible to solve the above-mentioned problem (VI), i.e., the problem in which the communication cable 9 wired from the cell monitor 6 may come into contact with and damage a corner or the like of the cell monitor 6 (see FIGS. 7 and 8).

It should be noted that although the above embodiments are examples of preferred embodiments of the present invention, the embodiments are not limited thereto and various modifications may be made without departing from the gist of the present invention. For example, although, in the above embodiment describing the wiring of the communication cable 9, an example in which the subject unit is a cell monitor 6 is described, it is possible, as a matter of course, that any other unit that is potentially incorporated in the fuel cell unit can be a subject unit.

INDUSTRIAL APPLICABILITY

The present invention is suitably applicable to a fuel cell unit comprising: a fuel cell stack that includes a cell stack body in which unit cells are stacked; and a cell monitor for monitoring the voltage of the unit cells.

DESCRIPTION OF REFERENCE NUMERALS

1: fuel cell unit
2: cell (unit cell)
3: fuel cell stack
5: voltage detector (cell monitor terminal)
6: cell monitor
6a: heat-generating part (of the cell monitor)
7: bracket
7a: clamp seat (for the bracket)
8: clamp
9: communication cable (cable)

What is claimed is:

1. A fuel cell unit comprising:
a fuel cell stack including a cell stack body in which unit cells are stacked; and
a cell monitor for monitoring a voltage of the unit cells, wherein:
the cell monitor is connected to a voltage detector to which a voltage detection wire is connected;
the voltage detector is constituted by cell monitor terminals that detect cell voltages of the respective unit cells;
the cell monitor has an area of at least a certain size that is required for mounting all of the cell monitor terminals;
the cell monitor is arranged in a state in which a surface having the area of at least the certain size required for mounting all of the cell monitor terminals is inclined with respect to a vertical direction; and
the cell monitor is inclined by providing a part of the cell monitor in the vicinity of a heat-generating part in a fuel cell on an opposite side of the heat-generating part relative to a central part in the vertical direction of the cell monitor and providing a part of the cell monitor in an area other than the heat-generating part in the fuel cell on a heat-generating part side relative to the central part in the vertical direction of the cell monitor.

2. The fuel cell unit according to claim 1, further comprising a bracket for fixing the cell monitor, the bracket being arranged on lateral surfaces located on both sides in a horizontal direction of the surface of the cell monitor having the area of at least the certain size required for mounting all of the cell monitor terminals.

3. The fuel cell unit according to claim 2, further comprising a clamp for restricting wiring of a communication cable that extends from the cell monitor, wherein the bracket is further provided with a clamp seat that allows the clamp to be seated thereon, and a seating surface of the clamp seat is inclined to a degree that allows the seating surface to be visible from a visual observation direction of an operator.

4. The fuel cell unit according to claim 3, wherein the clamp is further provided with a through-hole that allows the communication cable to pass through the clamp, the through-hole being arranged in a direction in which the communication cable wired from the cell monitor to outside projects from the cell monitor to the outside.

5. A fuel cell unit comprising:
a fuel cell stack including a cell stack body in which unit cells are stacked; and
a cell monitor for monitoring a voltage of the unit cells;
a bracket for fixing the cell monitor; and
a clamp for restricting wiring of a communication cable that extends from the cell monitor, wherein:
the cell monitor is connected to a voltage detector to which a voltage detection wire is connected;
the voltage detector is constituted by cell monitor terminals that detect cell voltages of the respective unit cells;
the cell monitor has an area of at least a certain size that is required for mounting all of the cell monitor terminals;
the cell monitor is arranged in a state in which a surface having the area of at least the certain size required for mounting all of the cell monitor terminals is inclined with respect to a vertical direction;

the bracket is arranged on lateral surfaces located on both sides in a horizontal direction of the surface of the cell monitor having the area of at least the certain size required for mounting all of the cell monitor terminals; and the bracket is further provided with a clamp seat that allows the clamp to be seated thereon, and a seating surface of the clamp seat is inclined to a degree that allows the seating surface to be visible from a visual observation direction of an operator.

6. The fuel cell unit according to claim 5, wherein the clamp is further provided with a through-hole that allows the communication cable to pass through the clamp, the through-hole being arranged in a direction in which the communication cable wired from the cell monitor to outside projects from the cell monitor to the outside.

\* \* \* \* \*